United States Patent
Vos (10) Patent No.: US 11,172,442 B2
(45) Date of Patent: Nov. 9, 2021

(54) METHOD AND APPARATUS FOR INDICATING A SYSTEM INFORMATION BLOCK CHANGE

(71) Applicant: Sierra Wireless, Inc., Richmond (CA)

(72) Inventor: Gustav Gerald Vos, Surrey (CA)

(73) Assignee: Sierra Wireless, Inc., Richmond (CA)

( * ) Notice: Subject to any disclaimer, the term of this patent is extended or adjusted under 35 U.S.C. 154(b) by 0 days.

(21) Appl. No.: 16/058,781

(22) Filed: Aug. 8, 2018

(65) Prior Publication Data

US 2019/0053156 A1 Feb. 14, 2019

Related U.S. Application Data

(60) Provisional application No. 62/542,690, filed on Aug. 8, 2017.

(51) Int. Cl.
*H04H 20/71* (2008.01)
*H04W 52/02* (2009.01)
*H04W 48/12* (2009.01)
*H04W 72/04* (2009.01)

(52) U.S. Cl.
CPC ....... *H04W 52/0216* (2013.01); *H04W 48/12* (2013.01); *H04W 72/042* (2013.01)

(58) Field of Classification Search
CPC ............. H04W 52/0216; H04W 48/12; H04W 72/042; H04W 52/02; H04W 84/12; H04W 72/005; H04W 4/06; H04L 12/189; H04L 12/185; H04L 12/18; H04K 45/16
USPC .......................................... 370/311, 312, 390
See application file for complete search history.

(56) References Cited

U.S. PATENT DOCUMENTS

| 8,630,216 B2 | 1/2014 | Deivasigamani et al. |
| 2014/0198685 A1* | 7/2014 | Xu ...................... H04W 72/048 370/254 |
| 2016/0234736 A1 | 8/2016 | Kubota et al. |
| 2017/0048920 A1 | 2/2017 | Kim et al. |
| 2018/0035468 A1* | 2/2018 | Ishii .................. H04W 72/0446 |
| 2018/0063815 A1* | 3/2018 | Ishii .................... H04W 72/005 |
| 2018/0132166 A1* | 5/2018 | Ishii ...................... H04W 48/12 |
| 2018/0167918 A1* | 6/2018 | Ishii ...................... H04W 48/12 |

(Continued)

FOREIGN PATENT DOCUMENTS

| WO | 2016186696 A1 | 11/2016 |
| WO | 2017026764 A1 | 2/2017 |

(Continued)

OTHER PUBLICATIONS

PCT/CA2018/050963 International Search Report dated Oct. 30, 2018.

(Continued)

*Primary Examiner* — Chuong T Ho
(74) *Attorney, Agent, or Firm* — Wagenknecht IP Law Group PC (57) ABSTRACT

A method and apparatus for indicating a system information block change in a wireless communication network is provided. According to the instant application, a single bit within the MIB is assigned as a change indicator, for example a SIB change indicator bit. As such upon the receipt of the MIB by the UE, evaluation of the change indicator within the MIB can enable the UE to determine if the SIB1 or SIB1-BR has changed.

14 Claims, 4 Drawing Sheets

(56) References Cited

U.S. PATENT DOCUMENTS

2018/0359682 A1* 12/2018 Nader .................. H04L 12/189
2019/0223094 A1* 7/2019 Ingale .................. H04W 48/14

FOREIGN PATENT DOCUMENTS

WO      2018203281 A1    11/2018
WO      2019028553 A1     2/2019

OTHER PUBLICATIONS

PCT/CA2018/050963 Written Opinion dated Oct. 30, 2018.
"3GPP TS 36.331 V14.3.0 (Jun. 2017) Technical Specification: 3rd Generation Partnership Project; Technical Specification Group Radio Access Network; Evolved Universal Terrestrial Radio Access (E-UTRA); Radio Resource Control (RRC); Protocol specification (Release 14)," 3GPP, Jun. 2017, 1-745.
"3GPP TSG RAN WG1 Meeting #89, R1-1707090, Discussion on system acquisition time reduction for MTC," ZTE, May 2017, 1-6.
EP18844149.7 Extended European Search Report dated Mar. 31, 2021.

* cited by examiner

METHOD AND APPARATUS FOR INDICATING A SYSTEM INFORMATION BLOCK CHANGE

CROSS REFERENCE TO RELATED APPLICATIONS

This application claims the benefit of priority to U.S. Provisional Patent Application No. 62/542,690 entitled "Method and Apparatus for Indicating a System Information Block Change" filed Aug. 8, 2017, the contents of which are incorporated herein by reference in their entirety.

FIELD OF THE INVENTION

The present invention pertains in general to wireless communications, for example following the LTE standard, and in particular to a method and apparatus for indicating a change in the system information block.

BACKGROUND

Release 12 of the Long Term Evolution (LTE) communication standard, developed by the $3^{rd}$ Generation Partnership Project (3GPP), introduced a new feature called Power Saving Mode (PSM). This is a specific kind of UE status that can be entered by a User Equipment (UE) in order to attempt to minimize energy consumption, such that PSM has an energy consumption that is even lower than normal idle mode energy consumption. A purpose of this feature is to substantially minimize energy consumption while the UE is not transmitting or receiving anything.

However, upon exiting a PSM cycle, a UE must determine if there have been any changes relating to system information messages used for connection of the UE to the wireless network during that PSM cycle. In order to determine if a change has occurred, the UE evaluates the systemInfoValueTag, which is acquired by decoding System Information Block 1 (SIB1), which may be in the form of a SIB1-Bandwidth Reduced (SIB1-BR). The UE will compare the newly acquired systemInfoValueTag, with the systemInfoValueTag previously know to the UE, and if they are the same, the UE understands that the system information has not changed since the beginning of the PSM cycle. As such, the UE does not have to further decode the SIB2 for example.

However, the processing of decoding the SIB1 or SIB1-BR at a high Maximum Coupling Loss (MCL) can require substantial UE time and power. For example, at the 3GPP TSG RAN WG1 Meeting #89 in document R1-1707090, entitled "Discussion on system acquisition time reduction for MTC," May 15 to 19, 2017, it was presented that "simulation results in Table 1 show that SIB1-BR acquisition time is significantly reduced by utilizing cross-subframe channel estimation and SIB1-BR accumulations across multiple transmission periods, and approximately half of the SIB1-BR acquisition time can be reduced by doubling SIB1-BR transmission".

TABLE 1

| Performance Metric | No Additional SIB1-BR Transmission | Double SIB1-BR Transmission |
|---|---|---|
| Acquisition time @ $50^{th}$ percentile | 320 ms | 140 ms |
| Acquisition time @ $90^{th}$ percentile | 570 ms | 300 ms |
| System overhead | ~20% | ~40% |

It is noted, that while the repetition of the SIB1-BR does improve the acquisition time, there is a trade off with respect to the resultant increase in system overhead.

Therefore there is a need for a method and apparatus for indicating a change in the system information block, that is not subject to one or more limitations of the prior art.

This background information is provided for the purpose of making known information believed by the applicant to be of possible relevance to the present invention. No admission is necessarily intended, nor should be construed, that any of the preceding information constitutes prior art against the present invention.

SUMMARY

An object of the present invention is to provide a method and apparatus for indicating a system information block change in a wireless communication network, such as an LTE system. In accordance with aspects of the present invention, there is provided a method, in a User Equipment (UE) associated with a wireless communication network, for determining a system information block change. The method includes determining if a UE sleep time is greater than a time period parameter and determining if a change indicator is set to changed. The method further includes decoding system information messages when the UE sleep time is greater than the time period parameter or when the change indicator is set to changed or both.

In accordance with another aspect of the present invention, there is provided a method, in a base station of a wireless communication network, for indicating a system information block change. The method includes determining if system information has changed in a predefined time period and setting a change indicator such that the change indicator is indicative of the determining. The method further includes broadcasting the change indicator.

In accordance with another aspect of the present invention, there is provided a User Equipment (UE) for use with a wireless communication network. The UE includes a wireless communication interface, a processor and a memory storing machine readable code thereon. The machine readable code when executed by the processor configures the UE to determine if a UE sleep time is greater than a time period parameter and determine if a change indicator is set to changed. The machine readable code when executed by the processor further configures the UE to decode system information messages when one or more of the UE sleep time is greater than the time period parameter and the change indicator is set to changed.

In accordance with another aspect of the present invention, there is provided a base station for use with a wireless communication network. The base station includes a wireless communication interface, a processor and a memory storing machine readable code thereon. The machine readable code when executed by the processor configures the base station to determine if system information has changed in a predefined time period and set a change indicator such that the change indicator is indicative of the determining.

The machine readable code when executed by the processor further configures the base station to broadcast the change indicator.

In some embodiments, the change indicator is integrated into a master information block. In some embodiments, the change indicator is a single bit and the change indicator is set to "0" to define that the system information has changed. In some embodiments, the change indicator is a single bit and the change indicator is set to "1" to define the system information is unchanged. In some embodiments, the predefined time period is a system information, SI, validity period.

BRIEF DESCRIPTION OF THE FIGURES

These and other features of the invention will become more apparent in the following detailed description in which reference is made to the appended drawings.

DETAILED DESCRIPTION

Figure 1:
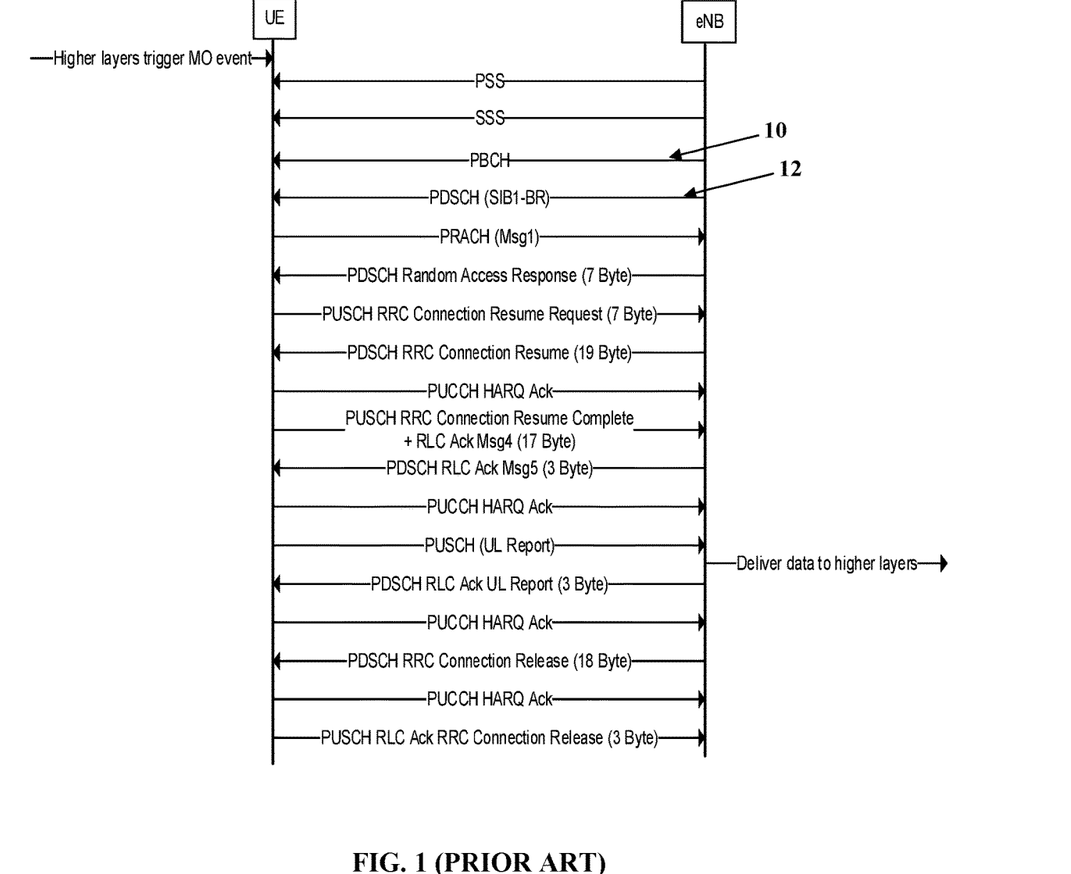
FIG. 1 illustrates a messaging sequence between the terminal and base station according to the prior art LTE standard.

FIG. 1 illustrates a messaging sequence between the terminal and base station according to the prior art LTE standard. As illustrated, in advance of the base station, for example an Evolved NodeB (eNB), transmitting the SIB1-BR 12 on the Physical Downlink Shared Channel (PDSCH), the base station transmits the Master Information Block on the Physical Broadcast Channel (PBCH) 10.

In the 3GPP TSG RAN WG1 Meeting #89 in document R1-1707090, entitled "Discussion on system acquisition time reduction for MTC," May 15 to 19, 2017, a mechanism was disclosed in order to skip SIB1-BR and SI message reading in some instances. In particular, it was disclosed that reserved bits in the MIB can be used for skipping system information reading. In particular it was disclosed that 2 reserved bits in MIB are used. Here, three of 4 states (e.g., "00", "01" and "10") are used to indicate one of the 3 pre-stored sets for system parameters being used by eNB, and one remaining state (e.g., "11") is used to enable fallback operation, i.e., reacquiring system parameters.

However, at this time there are a total of 24 bits in the MIB, which are used to define several system parameters. In particular, 3 bits are used to define system bandwidth, 3 bits are used for Physical Hybrid Automatic Repeat Request Indicator Channel (PHICH) information, 8 bits are used for the system frame number, 5 bits are used to indicate SIB1-BR scheduling information and the final 5 bits are spare bits. It is noted that prior to the assignment of 5 bits to indicate SIB1-BR scheduling information, an MIB had 10 spare bits. Given the current bit assignment associated with the MIB, the above disclosure relating to the assignment of two MIB bits to define if skipping SIB1-BR and SI message reading is possible, can be impractical, as this would merely leave 3 bits remaining for any future expansion.

The present invention, provides a method and apparatus for indicating a change in system information. According to embodiments the indication of system information change can aid in the reduction of system information message decoding for example SIB1 or SIB1-BR decoding, upon the ending of a PSM cycle or other cycle wherein the UE must determine if system information has changed. According to the instant application, a single bit within the MIB is assigned as a change indicator, for example a SIB change indicator bit. As such upon the receipt of the MIB by the UE, evaluation of the change indicator within the MIB can enable the UE to determine if the SIB1 or SIB1-BR has changed. For example, this evaluation can be based on a comparison of the status of the change indicator prior to entry into PSM by the UE. It would be readily understood that while it is defined that the change indicator is a bit within the MIB, the change indicator can alternatively be integrated into another block that is broadcast by the base station to the UE, wherein this block is broadcast in advance of the reception of the system information messages, in order to enable the UE to determine if skipping the decoding of the system information messages is possible.

However, in some instances, there can be several changes to the SIB1 or SIB1-BR that occur during a period of time that the UE is not receiving the required system information. In some embodiments, the SIB change indicator bit defined in the MIB, can identify if a change has occurred with respect to the SIB1 or the SIB1-BR during a predefined time period. As such, upon evaluation of the SIB change indicator bit, the UE can determine not only that a change has occurred, but further will have the details relating to the predefined time period with respect to the change. For example, in instances where a UE is in PSM for an interval greater than the predefined time period, the UE will be able to determine if the SIB1 or SIB1-BR has changed during that predefined time period. As would be readily understood, the terms "predefined time period" and the terms "predetermined time period" can be interchangeably used to define the same feature.

According to embodiments, by enabling the detection of a change in system information upon a UE exiting a PSM cycle, an enhancement of battery life of the UE can be enabled, in particular for UEs which operate with a shorter PSM cycle, for example a PSM cycle in range of less than 8 hours. It is contemplated that enabling the detection of a change in system information upon a UE exiting a PSM cycle, wherein the PSM cycle is less than 8 hours, may provide a UE battery life in the range of 10 years.

Figure 2:
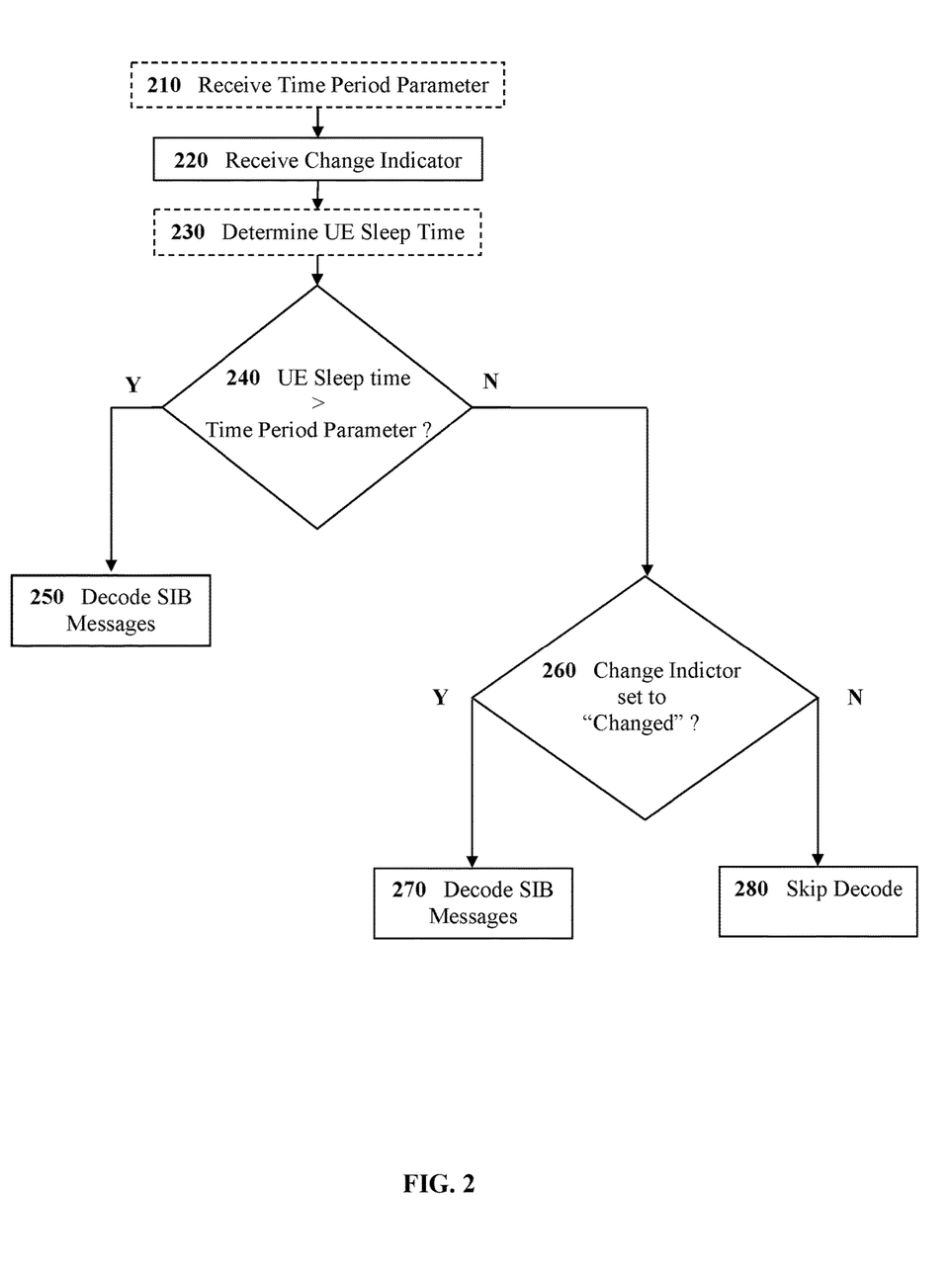
FIG. 2 illustrates a method, in a UE, for determining a system information block change, in accordance with embodiments of the present invention.

FIG. 2 illustrates a method, in a UE, for determining a system information block change, in accordance with embodiments of the present invention. As illustrated, the UE receives a change indicator 220 and subsequently determines if the UE sleep time, for example the length of the PSM cycle from which the UE is exiting, is greater that a time period parameter 240. In instances where the UE sleep time is greater than the time period parameter the UE proceeds to decode 250 subsequently system information messages, for example SIB1/SIB1-BR, SIB2 and the like. In instances where the UE sleep time is less than the time period parameter, the UE determines if the change indicator has been set to "changed" 260. For example, when the change indicator is a single bit set to "0", the change indicator indicates changes have occurred with respect to system information during the last predetermined time period. In instances where the change indicator is set to changed, the UE proceeds to decode 270 subsequently received system information messages. However, instances where the change indicator is set to unchanged, the UE skips 280 the decode step as the system information currently stored in memory on the UE remains valid.

In some embodiments, the UE receives a time period parameter 210 from the base station. For example, the time period parameter can be broadcast by the base station. The time period parameter is indicative of the predefined time period which is compared to the UE sleep time at 240. In some embodiments, the UE is configured to determine the UE sleep time 230, which is used for the comparison at 240.

According to some embodiments, the predefined time period can be set based on parameters defined by a mobile network operator (MNO) and as such may vary between different MNOs. For example, the predefined time period can be dependent on how often system information changes for that particular MNO, for example which may be defined as a SI validity period for that MNO.

It is understood that in some instances system information can change infrequently, for example only on a monthly basis. However, an exception to this infrequent change in system information can result from extended access barring (EAB) which is an access-control mechanism configured to limit congestion in a network. For example, a machine type communication (MTC) device can determine itself whether it is subject to barring based on an EAB block that is broadcast by the network. As such, if the MTC device determines that it is subject to EAB, the device will refrain from sending a connection request signal, thereby mitigating congestion of the network. As such, in some embodiments, devices that are subject to EAB, may not be configured to detect if system information has changed or not by way of the change indicator.

Figure 3:
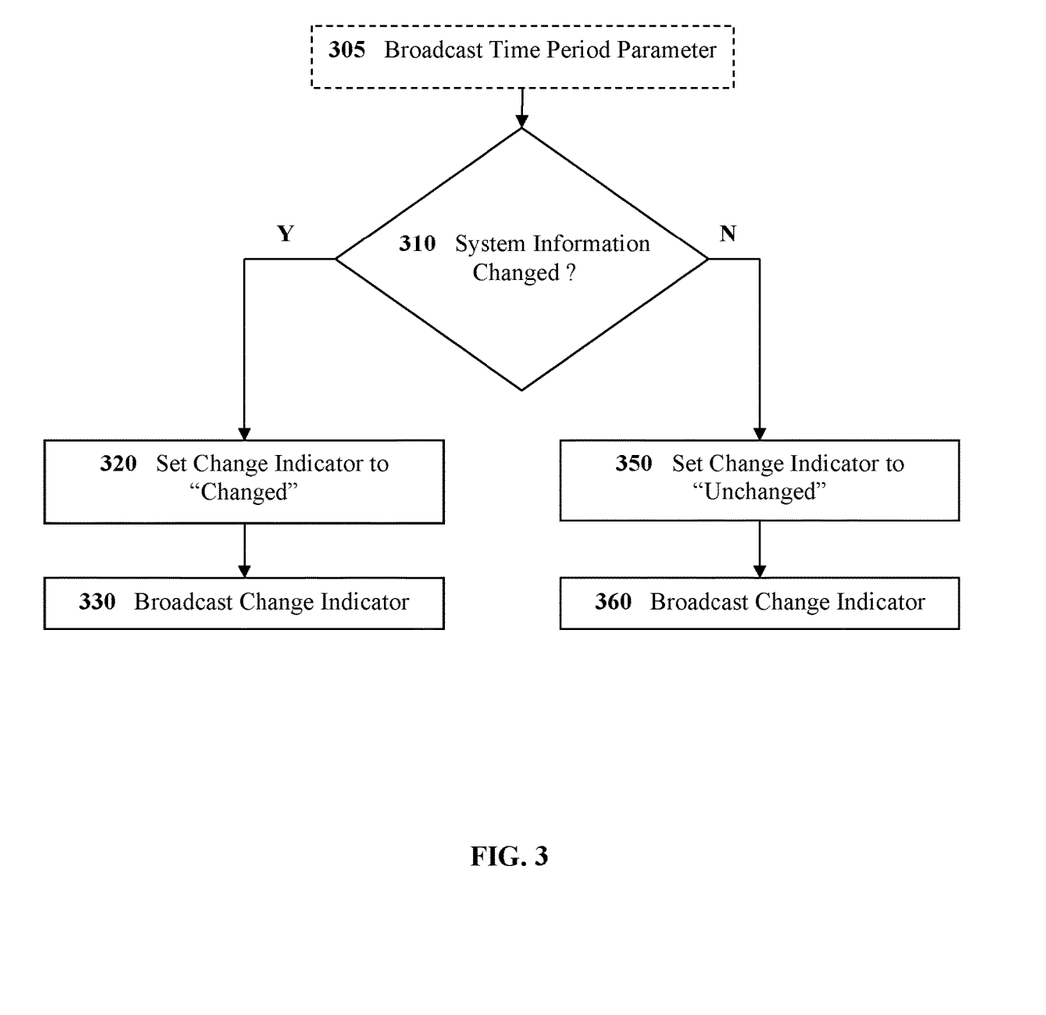
FIG. 3 illustrates a method, in a base station, for indicating a system information block change, in accordance with embodiments of the present invention.

FIG. 3 illustrates a method, in a base station, for indicating a system information block change, in accordance with embodiments of the present invention. As illustrated, the base station determines if system information has changed 310, for example has the SIB1/SIB1-BR changed. In the instance where the system information has changed, the base station sets the change indicator to "changed" 320. For example, the base station sets the change indicator bit to be equivalent to "0". The base station subsequently broadcasts the change indicator 330. In some embodiments, the change indicator is integrated into the MIB. As would be readily understood, in other embodiments the change bit indicator equivalent to "1" indicates that the system information has changed.

In the instance where the system information has not changed, the base station sets the change indicator to "unchanged" 350 and subsequently broadcasts the change indicator 360. For example, the base station sets the change indicator bit to be equivalent to "1" if the system information has not changed or is unchanged. As would be readily understood, in other embodiments the change bit indicator equivalent to "0" indicates that the system information is unchanged.

In some embodiments, in advance of broadcasting the change indicator, the base station broadcasts the time period parameter 305. The time period parameter is indicative of the predetermined time period. As previously noted, the predefined time period can be set based on parameters defined a mobile network operator (MNO) and as such may vary between different MNO s.

According to some embodiments, the predefined time period is defined to begin when a change in SIB1/SIB1-BR occurs.

According to embodiments, after the predefined time period has expired without any further changes to the SIB1/SIB1-BR, the bases station resets the change indicator to "unchanged".

According to embodiments, if during a time period when the change indicator is set to "changed" and a further change in the SIB1/SIB1-BR occurs, the change indicator remains set as "changed" for the predefined time period. In this embodiment, the predefined time period begins upon the last change of the SIB1/SIB1-BR. Upon expiration of the predefined time period without any further changes to the SIB1/SIB1-BR, the base station resets the change indicator to "unchanged".

Various embodiments of the present invention may be implemented as a computer-implemented method, namely a method whose steps are implemented by computing devices such as by a combination of LTE network infrastructure devices such as eNBs or related infrastructure equipment as well as LTE wireless terminal UEs such as MTC UEs or other UEs. The method may thus be implemented in a distributed manner. The computing devices may implement the method by executing, by a processor (e.g. microprocessor), computer instructions stored in memory and operating various electronics associated with and controlled by the computing devices accordingly. Additionally or alternatively, some or all of the operations of the computing devices may be executed by electronics executing firmware instructions or dedicated electronics hardware configured to operate in a predetermined manner when presented with predetermined patterns of electronic inputs. In particular, a processor executing instructions stored in memory can be replaced, in some embodiments, with other electronic components (e.g. comprising FPGAs, ASICs, etc.) which perform the same function.

Various embodiments of the present invention may correspond to a system comprising a combination of LTE network infrastructure devices such as eNBs or related infrastructure equipment as well as LTE wireless terminal UEs such as MTC UEs or other UEs. The system may be described in terms of interacting modules, wherein each module corresponds to a selection of electronic components operating together to produce an effect. It should also be understood that embodiments of the present invention provide for a UE, a base station, or a system comprising same, which are configured to operate in accordance with one or a combination of the methods described herein.

Figure 4:
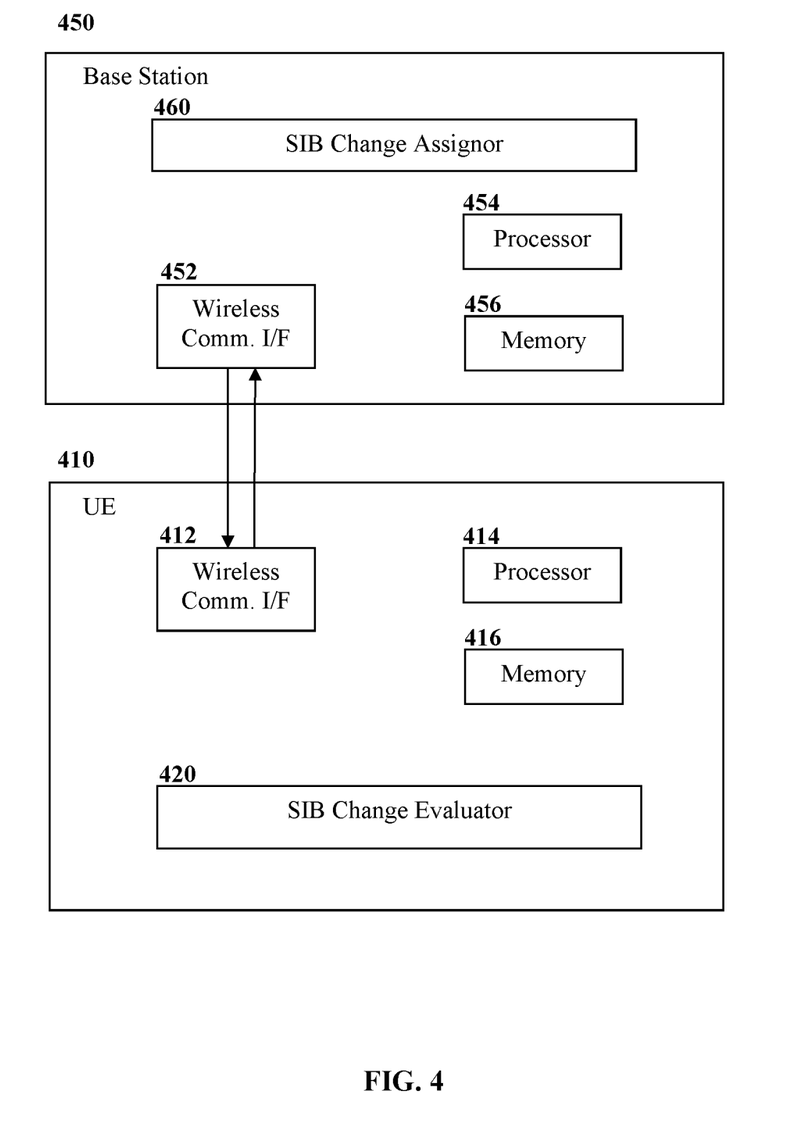
FIG. 4 illustrates a UE and a base station (eNB) of a wireless communication network, in accordance with embodiments of the present invention.

FIG. 4 illustrates a UE 410 and a base station 450 (for example an eNB) of a wireless communication network, in accordance with an embodiment of the present invention. The UE 410 includes a wireless communication interface 412, a processor 414 and a memory 416. The memory 416 can include program instructions for execution by the processor 414 in order to cause the UE 410 to operate as described herein, for example to perform the methods described with respect to FIG. 2. The base station 450 includes a wireless communication interface 452, a processor 454 and a memory 456. The memory 456 can include program instructions for execution by the processor 454 in order to cause the base station 450 to operate as described herein, for example to perform the method described with respect to FIG. 3. The UE 410 and the base station 450 communicate with each other via their respective wireless communication interfaces, for example using protocols compliant with the LTE standard.

In particular, the UE 410 is configured to receive, for example via the wireless communication interface 412 a change indicator. The UE is further configured, for example via the SIB change evaluator 420 to determine if a UE sleep time is greater than a time period parameter. The SIB change evaluator 420 is further configured to determine if a change indicator is set to changed. The UE is further configured to decode the system information messages when either or both the UE sleep time is greater than a time period parameter and the change indicator is set to changed.

The base station 450 is configured to determine, using the SIB change assignor 460, if system information has changed in a predetermined time period. The base station 450 is further configured for example via operation of SIB change assignor, to set a change indicator such that the change indicator is indicative of whether system information has changed. The base station, via the wireless communication interface 452, broadcasts the change indicator. In some embodiments, the base station broadcasts the change indicator such that it is integrated into the MIB.

It will be understood that the term "base station" or "base transceiver station (BTS)" refers to an evolved NodeB (eNB), a radio access node, or another device in a wireless communication network infrastructure, such as an LTE infrastructure, which performs or directs at least some aspects of wireless communication with wireless communication devices. The term "terminal" or "UE" refers to a device, such as a mobile device, MTC device, or other device, which accesses the wireless communication network infrastructure via wireless communication with a base station.

It will be appreciated that, although specific embodiments of the technology have been described herein for purposes of illustration, various modifications may be made without departing from the spirit and scope of the technology. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

I claim:

1. A method, in a User Equipment, UE, associated with a wireless communication network, for determining a system information block, SIB, change, the method comprising:
   determining if a UE sleep time is greater than a time period parameter;
   determining if a change indicator is set to changed; and
   decoding SIB messages upon determining that the UE sleep time is greater than the time period parameter or upon determining that the change indicator is set to changed or both;
   wherein upon the SIB change, the change indicator is set to changed for a predefined time period from a last SIB change, wherein upon expiration of the predefined time period without further changes to the SIB, the UE receives the change indicator set to unchanged, the time period parameter indicative of the predefined time period.

2. The method of claim 1, wherein the change indicator is integrated into a master information block.

3. The method of claim 1, wherein the change indicator is a single bit and the change indicator is set to "0" to define that the system information has changed.

4. The method of claim 1, wherein the change indicator is a single bit and the change indicator is set to "1" to define the system information is unchanged.

5. The method of claim 1, further comprising determining the UE sleep time.

6. The method of claim 1, further comprising receiving the time period parameter.

7. The method of claim 6, wherein the time period parameter is indicative of a system information, SI, validity period.

8. A User Equipment, UE, for use with a wireless communication network, the UE comprising a wireless communication interface, a processor and a memory storing machine readable code thereon, the machine readable code when executed by the processor configures the UE to:
   determine if a UE sleep time is greater than a time period parameter;
   determine if a change indicator is set to changed; and
   decode system information messages upon determining that one or more of the UE sleep time is greater than the time period parameter and the change indicator is set to changed;
   wherein upon a system information block, SIB, change, the change indicator is set to changed for a predefined time period from a last SIB change, wherein upon expiration of the predefined time period without further changes to the SIB, the UE receives the change indicator set to unchanged, the time period parameter indicative of the predefined time period.

9. The UE of claim 8, wherein the change indicator is integrated into a master information block.

10. The UE of claim 8, wherein the change indicator is a single bit and the change indicator is set to "0" to define that the system information has changed.

11. The UE of claim 8, wherein the change indicator is a single bit and the change indicator is set to "1" to define the system information is unchanged.

12. The UE of claim 8, wherein the machine readable code when executed by the processor further configures the UE to determine the UE sleep time.

13. The UE of claim 8, wherein the machine readable code when executed by the processor further configures the UE to receive the time period parameter.

14. The UE of claim 13, wherein the time period parameter is indicative of a system information, SI, validity period.

* * * * *